United States Patent
Patnaikuni et al.

(10) Patent No.: US 11,759,875 B2
(45) Date of Patent: Sep. 19, 2023

(54) AUTONOMOUS ROBOTIC THREAD FOR REPAIRING STRUCTURES

(71) Applicant: International Business Machines Corporation, Armonk, NY (US)

(72) Inventors: Subha Kiran Patnaikuni, Visakhapatnam (IN); Sarbajit K. Rakshit, Kolkata (IN)

(73) Assignee: International Business Machines Corporation, Armonk, NY (US)

( * ) Notice: Subject to any disclaimer, the term of this patent is extended or adjusted under 35 U.S.C. 154(b) by 373 days.

(21) Appl. No.: 17/029,932

(22) Filed: Sep. 23, 2020

(65) Prior Publication Data

US 2022/0088692 A1 Mar. 24, 2022

(51) Int. Cl.
*B23K 35/00* (2006.01)
*B23G 9/00* (2006.01)
(Continued)

(52) U.S. Cl.
CPC .......... *B23G 9/009* (2013.01); *B23K 35/0227* (2013.01); *B23P 6/00* (2013.01)

(58) Field of Classification Search
CPC .. B23G 9/009; B23K 35/0227; B23K 1/0008; B23K 35/00–406; B23K 2035/408;
(Continued)

(56) References Cited

U.S. PATENT DOCUMENTS 5,126,521 A * 6/1992 McGaffigan .......... H01R 4/723
219/616
11,305,366 B2 * 4/2022 Peters ................ B23K 26/0006
(Continued)

FOREIGN PATENT DOCUMENTS

CA 2941992 A1 * 5/2017 ............. B23K 10/02
CN 102534168 A * 7/2012
(Continued)

OTHER PUBLICATIONS

Chu, Jennifer, "Robotic thread is deigned to slip through the brain's blood vessels", MIT News, Aug. 28, 2019, 4 pages, <http://news.mit.edu/2019/robot-brain-blood-vessels-0828>.
(Continued)

*Primary Examiner* — Kiley S Stoner
(74) *Attorney, Agent, or Firm* — Monchai Chuaychoo (57) ABSTRACT

Embodiments of the present invention provides an approach for repairing defects in a structure, located in difficult to reach area, by using a self-guiding and self-melting robotic thread. The approach can use an external guidance system to find the target location of the structure and deploy a robotic thread to the defective area. Portion of the robotic thread contains a filler material can have similar materials to the structure. After the system has determined the size, length and volume of the repair, the system calculates the required length of the robotic thread and guides the thread to the defective area. Once the robotic thread is in place, the filler material begins to melt via heat. The filler material, in a melted and pliable state, can flow into the defect area. Once cooled, the filler material can now support the structure.

14 Claims, 6 Drawing Sheets

(51) Int. Cl.
*B23P 6/00* (2006.01)
*B23K 35/02* (2006.01)

(58) Field of Classification Search
CPC ...... B23P 6/00; B22F 12/90; B22F 2007/068; B22F 10/85; B22F 10/20; C22C 2200/02; C22C 14/00; C22C 19/03; B33Y 10/00; Y02P 10/25
USPC ........ 228/56.3, 244–256; 219/605, 615–617, 219/636–637, 56–58, 145.1–147
See application file for complete search history.

(56) References Cited

U.S. PATENT DOCUMENTS

| | | | |
|---|---|---|---|
| 11,480,947 B2 * | 10/2022 | Iriguchi | ............. G05B 19/4099 |
| 2005/0109823 A1 * | 5/2005 | Gruber | .................. B23K 3/053 |
| | | | 228/256 |
| 2016/0059302 A1 | 3/2016 | McBrien | |
| 2016/0236414 A1 | 8/2016 | Reese | |
| 2017/0151621 A1 * | 6/2017 | Klegin | .................. B23K 9/092 |
| 2018/0081334 A1 | 3/2018 | Bostick | |
| 2018/0354054 A1 * | 12/2018 | Barhorst | ............... B21C 37/045 |
| 2019/0099769 A1 * | 4/2019 | Holverson | .............. B05B 12/18 |
| 2019/0184486 A1 * | 6/2019 | Flamm | .................... B22F 12/22 |

FOREIGN PATENT DOCUMENTS

| | | | | | |
|---|---|---|---|---|---|
| CN | 104527067 B | | 3/2017 | | |
| CN | 107116290 A | | 9/2017 | | |
| CN | 108115282 A | | 6/2018 | | |
| CN | 109249132 A | | 1/2019 | | |
| CN | 110539081 A | | 12/2019 | | |
| CN | 110961822 A | | 4/2020 | | |
| CN | 115747538 A | * | 3/2023 | | |
| EP | 3495083 A1 | * | 6/2019 | ............. | B22F 10/20 |
| JP | H11302817 A | * | 11/1999 | | |
| KR | 101601232 B1 | * | 3/2016 | | |
| WO | WO-2014171269 A1 | * | 10/2014 | ......... | B23K 35/0255 |
| WO | 2019177607 A1 | | 9/2019 | | |
| WO | WO-2020215633 A1 | * | 10/2020 | | |
| WO | 2022063085 A1 | | 3/2022 | | |

OTHER PUBLICATIONS

Joesinstructables, "Snake Robot", Instructables, downloaded from the internet on Aug. 14, 2020, 15 pages, <https://www.instructables.com/id/Snake-Robot-1/>.

Lipton et al., "3D Printing Variable Stiffness Foams Using Viscous Thread Instability", Scientific Reports|6:29996| DOI:10.1038/srep29996, Published Aug. 9, 2016, 6 pages, <https://pubmed.ncbi.nlm.nih.gov/27503148/>.

Verma, Alka, "Soldering Material", DNA Technology, downloaded from the internet on Aug. 14, 2020, 6 pages, <https://www.dnatechindia.com/basic-soldering-material.html>.

International Search Report and Written Opinion, International Application No. PCT/CN2021/119354, International Filing Date Sep. 18, 2021.

* cited by examiner

AUTONOMOUS ROBOTIC THREAD FOR REPAIRING STRUCTURES

BACKGROUND

The present invention relates generally to structure repair, and more particularly to repairing parts of a structure by using self-heating and melting robotic thread.

3D printing is being used for printing or correcting defects, in current days metals area also being used for 3D printing. In different complex structures, like building, bridge, machine etc., periodic maintenance may be required to ensure that there is no crack in the structure or correcting the crack. While correcting the crack, the filler material is generally applied around the crack area. In this scenario, 3D printing machine, can be used for laying the filler material around the crack area to correct the defect.

SUMMARY

Aspects of the present invention disclose a method, a device and system for repairing a structure. The method may be implemented by one or more computer processors and may include receiving a defect location for a structure; sending a robotic thread to the defect location; determining the volume and length required of the robotic thread; guiding the robotic thread towards the defect location; and repairing the defect location.

According to another embodiment of the present invention, there is provided a device. The device comprises a center structure; an outer center structure adjacent to the center structure; an outer jacket structure adjacent to the outer center structure; a first segmented section containing the center structure, the outer center structure and the outer jacket structure; a first computer control circuit attached to the first segmented section; a second segmented section containing the center structure, the outer structure and the outer jacket structure; a second computer control circuit attached to the second segmented section; and a north end the first segmented section is joined to a south end of the second segmented section.

According to a yet further embodiment of the present invention, there is provided a system. The system comprises a guidance system; a heating system; a center structure; an outer center structure adjacent to the center structure; an outer jacket structure adjacent to the outer center structure; a first segmented section containing the center structure, the outer center structure and the outer jacket structure; a first computer control circuit attached to the first segmented section; a second segmented section containing the center structure, the outer structure and the outer jacket structure; a second computer control circuit attached to the second segmented section; and a north end the first segmented section is joined to a south end of the second segmented section.

BRIEF DESCRIPTION OF THE DRAWINGS

Preferred embodiments of the present invention will now be described, by way of example only, with reference to the following drawings, in which.

DETAILED DESCRIPTION

A structure (e.g., building, bridges, machine, etc.), located on diverse terrain, with defects/cracks that needs repair can be difficult for any machine or human to travel and correct the defect. Embodiments of the present invention provides an approach for repairing those defects by using a self-heating and self-melting robotic thread. The approach can use an external guidance system to find the target location (i.e., defective area) of the structure and deploy a robotic thread to the defective area. Certain section of the robotic thread (i.e., filler material) can have similar materials to the structure. After the system has determined the size, length and volume of the repair, the system calculates enough robotic thread and guides the thread to the defective area. Once the robotic thread is in place, the filler material begins to melt via heat (e.g., self-heat using short-circuit, external heat from a laser/heating source, etc.). The filler material, in a melted and pliable state, can flow into the defect area. Once cooled, the filler material can now support the structure.

Other embodiments of the present invention may recognize one or more of the following facts, potential problems, potential scenarios, and/or potential areas for improvement with respect to the current state of the art: i) able to repair structures that is in a remote location where it is difficult to access with conventional transportation method, ii) provide low cost material and manpower to repair structure and iii) able to traverse hard to reach space to fix cracks/defects deep inside a structure.

In another embodiment, an approach for a self-heating and self-melting robotic thread is provided to be used in 3D printing environment. For example, in a car factory, once an object (i.e., car frame) has been 3d printed (using metals), if a defect within a small area of the frame is detected, it might be cost prohibitive to scrap the entire car frame but use a robotic thread to fix the defect.

References in the specification to "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments, whether or not explicitly described.

It should be understood that the Figures are merely schematic and are not drawn to scale. It should also be understood that the same reference numerals are used throughout the Figures to indicate the same or similar parts.

Figure 1:
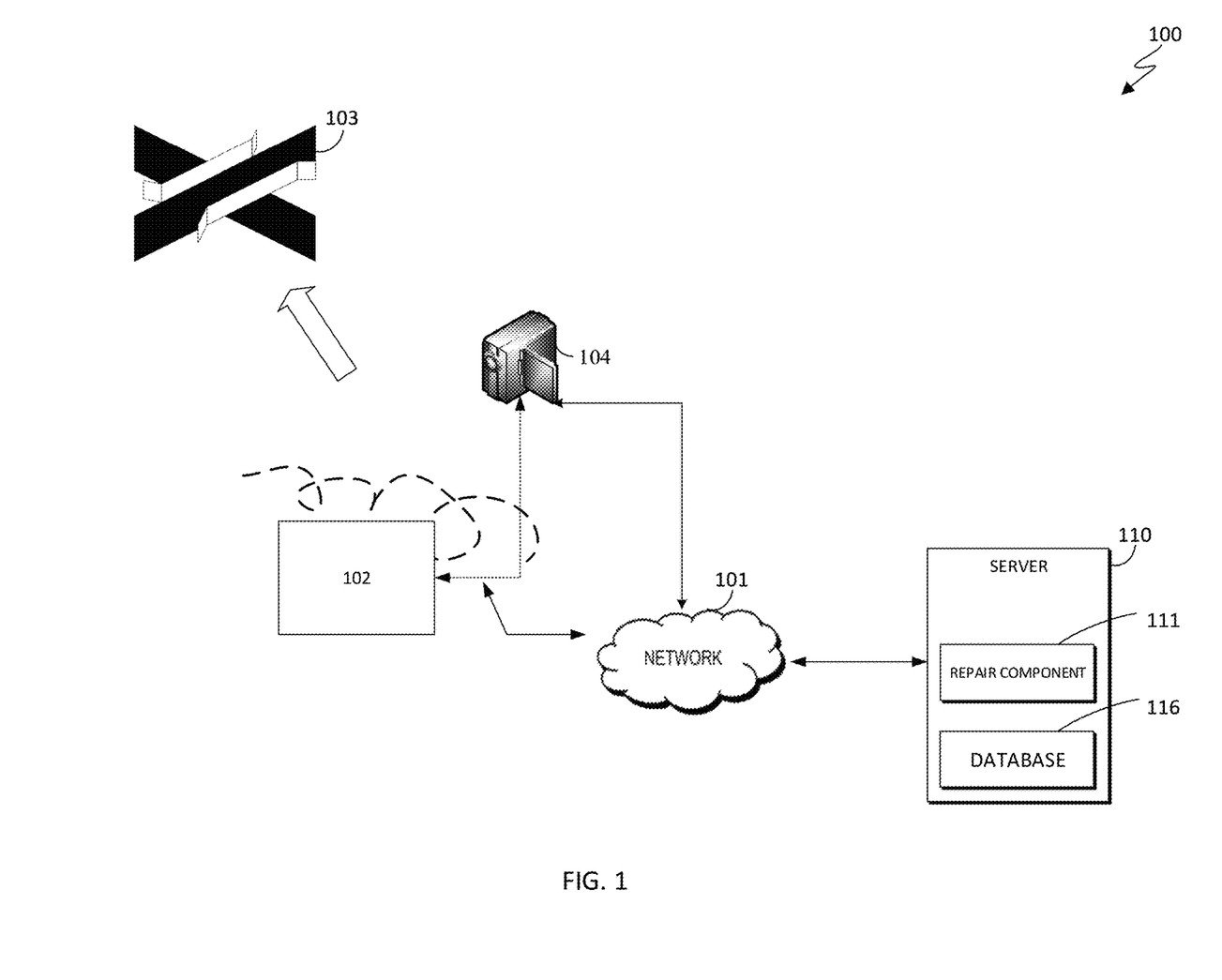
FIG. 1 is a functional block diagram illustrating a high level overview of the robotic thread environment and the equivalent graphics representation, designated as 100, in accordance with an embodiment of the present invention.

FIG. 1 is a functional block diagram illustrating a robotic thread environment in accordance with an embodiment of the present invention. FIG. 1 provides only an illustration of one implementation and does not imply any limitations with regard to the environments in which different embodiments may be implemented. Many modifications to the depicted environment may be made by those skilled in the art without departing from the scope of the invention as recited by the claims.

Robotic thread environment includes network 101, robotic thread 102, defective structure 103, guidance system 104 and server 110.

Network 101 can be, for example, a telecommunications network, a local area network (LAN), a wide area network (WAN), such as the Internet, or a combination of the three, and can include wired, wireless, or fiber optic connections. Network 101 can include one or more wired and/or wireless networks that are capable of receiving and transmitting data, voice, and/or video signals, including multimedia signals that include voice, data, and video information. In general, network 101 can be any combination of connections and protocols that can support communications between server 110, robotic thread 102 and other computing devices (not shown) within robotic thread environment. It is noted that other computing devices can include, but is not limited to, robotic thread 102 and any electromechanical devices capable of carrying out a series of computing instructions.

Robotic thread 102 is a system containing a robotic thread that can be deployed to repair/fix a defective and/or broken structure. The overall thread is flexible, can be folded, bended on its own during travel. In one embodiment, robotic thread 102 can be self-containing thread wherein the power and guidance system is built-in. In another embodiment, robotic thread 102 does not contain a guidance or power system. The subcomponents of robotic thread 102 will be discussed in greater details in FIGS. 2A, 2B and 2C.

Defective structure 103 is any structure that needs repair by robotic thread 102. Defective structure 103 can include, but it is not limited to, bridges, buildings, roadway, rail track, etc. The filler material of robotic thread 102 can have an impact on what structure can be repaired.

Guidance system 104 is a system comprising of sensors, drones and computing processing unit that can determine the exact defect/broken area of defective structure 103 and can deploy robotic thread 102 close to the location of the defect. For example, a guidance system 104 can be self-contained drone that can carry a spool of robotic thread 102 to repair a bridge in a remote mountainous area.

In another embodiment, guidance system 104 can include a self-contained magnetic field generating device for guiding robotic thread 102. The magnetic field can repel or attract robotic thread towards a path.

Server 110 can be a standalone computing device, a management server, a web server, a mobile computing device, or any other electronic device or computing system capable of receiving, sending, and processing data. In other embodiments, server 110 can represent a server computing system utilizing multiple computers as a server system, such as in a cloud computing environment. In another embodiment, server 110 can be a laptop computer, a tablet computer, a netbook computer, a personal computer (PC), a desktop computer, a personal digital assistant (PDA), a smart phone, or any other programmable electronic device capable of communicating other computing devices (not shown) within robotic thread environment 100 via network 101. In another embodiment, server 110 represents a computing system utilizing clustered computers and components (e.g., database server computers, application server computers, etc.) that act as a single pool of seamless resources when accessed within robotic thread environment.

Embodiment of the present invention can reside on server 110. Server 110 includes repair component 111 and database 116.

Repair component 111 provides the capability of, i) locating the defective area of defective structure 103, ii) calculating the dimension (e.g., size, volume, area, etc.) of the defective area and determining the length of robotic thread 102 required to repair the defective area, iii) directing/deploying robotic thread 102 to defective structure 103 and iv) instructing robotic thread 102 to repair the defect.

Database 116 is a repository for data used by repair component 111. Database 116 can be implemented with any type of storage device capable of storing data and configuration files that can be accessed and utilized by server 110, such as a database server, a hard disk drive, or a flash memory. Database 116 uses one or more of a plurality of techniques known in the art to store a plurality of information. In the depicted embodiment, database 116 resides on server 110. In another embodiment, database 116 may reside elsewhere within robotic thread environment, provided that repair component 111 has access to database 116. Database 116 may store information associated with, but is not limited to, load carrying capacity of fillable material, melting point of fillable material and weather condition that could affect defective area.

Figure 2A:
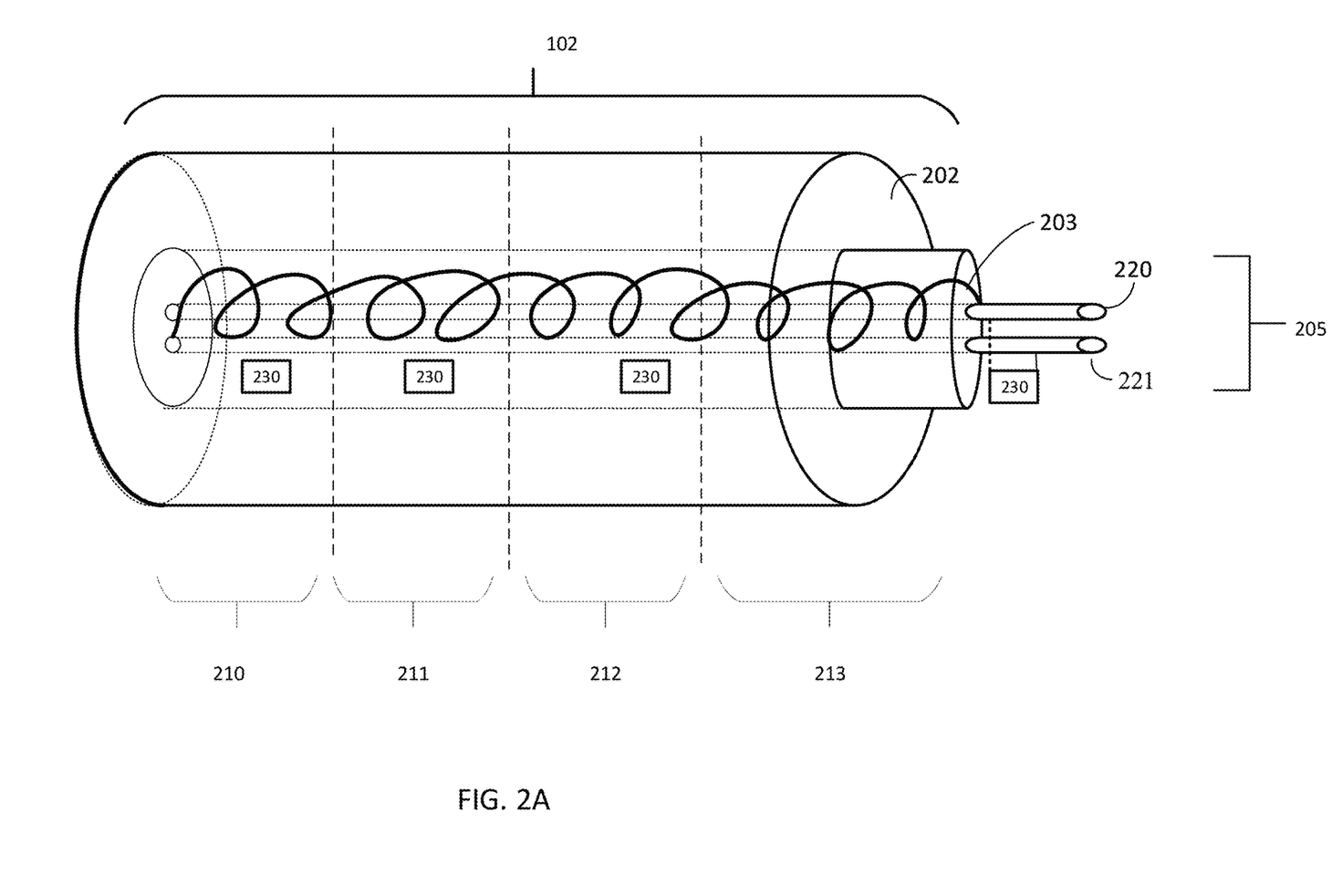
FIG. 2A is a diagram illustrating the cross section of a robotic thread 102, in accordance with an embodiment of the present invention.

FIG. 2A is a diagram illustrating the cross section of a robotic thread 102, in accordance with an embodiment of the present invention. Robotic thread 102 contains many sections/segments (e.g., 210, 211, 212 and 213) that contains identical embedded components. It is noted that each segment/section can be separated by intermediate space (i.e., empty area) to retain flexibility. Using section 213 to illustrate, section 213 contains computer microprocessor 230, filler material 202, helical coil 203, wire one 220 and wire two 221. As shown, robotic thread 102 is a long cylindrical structure (i.e., cable) with an inner core 205 and inner core 205 is surrounded by filler material 202. Inner core 205 is a hollow core containing helical coil 203, wire one 220 and wire two 221. Helical coil 203 (e.g., Maxwell coil, Helmholtz coil, etc.) is a coil of an electrically conductive wire (e.g., copper, silver, gold, etc.) that can be energized to form a magnetic field within the coil or helical coil 203 can be energized externally from a power source. Additionally, helical coil 203 can respond (i.e., attracted or repelled) to an external magnetic field and can be steerable by those external fields. In general, helical coil 203 provides locomotion for the segment or the entire length of robotic thread 102 using existing electromagnetic actuation (EMA) technology for movement.

Wire one 220 can be used for power wire (e.g., direct current or alternating current) and wire two 221 can be used for neutral/ground/return wire (depending if AC or DC current is used on wire one 220). It is noted that material for wire one 220 and wire two 221 can be used from a nickel-titanium alloy or any material that is electrically conductive (e.g., gold, silver, etc.). Both wires (e.g., wire one 220 and wire two 221) can be used to power computer microprocessor 230 and/or helical coil 203.

Filler material 202 can be made from material similar to fuse/solder (e.g., silver, tin, zinc, lead, copper and aluminum, etc.). Usually filler material 202 can have a low melting point, low ohmic loss, high conductivity, low resistivity. In another embodiment, the outer layer of filler material 202 can contain a layer of slippery coating (e.g., lubrication, hydrogel, etc.) to help robotic thread 102 fit into tight spaces.

Computer microprocessor 230 is a standalone computing device or any other electronic device or computing system capable of receiving, sending, and processing data. Computer microprocessor 230 can send instruction each segment (e.g., 210, 211, 212 and 213) of robotic thread 102 to move in concerted manner (i.e., self-guiding to the defective location) and can instruct each or all section to melt (i.e., short circuit) filler material 202. Computer microprocessor 230 can contain a wireless/wired communication component (to receive instructions/guidance from external system) and a power supply (i.e., battery). As shown in FIG. 2A, computer microprocessor 230 is connected to wire one 220 and wire two 221. If given a command/instruction, computer microprocessor 230 can short circuit the two wires (e.g., 220 and 221) to create a short. The short can generate sufficient heat to melt filler material 202 of that segment/section (i.e., section 213).

In the current embodiment, the diameter of the thread can exceed 5 to 6 inches due to the size of the components integrated into the thread. The length of the thread can be wound onto a spool to be deployed. Thus, length of robotic thread 102 can be short as a few inches or as long as a mile.

Figures 2B, 2C:
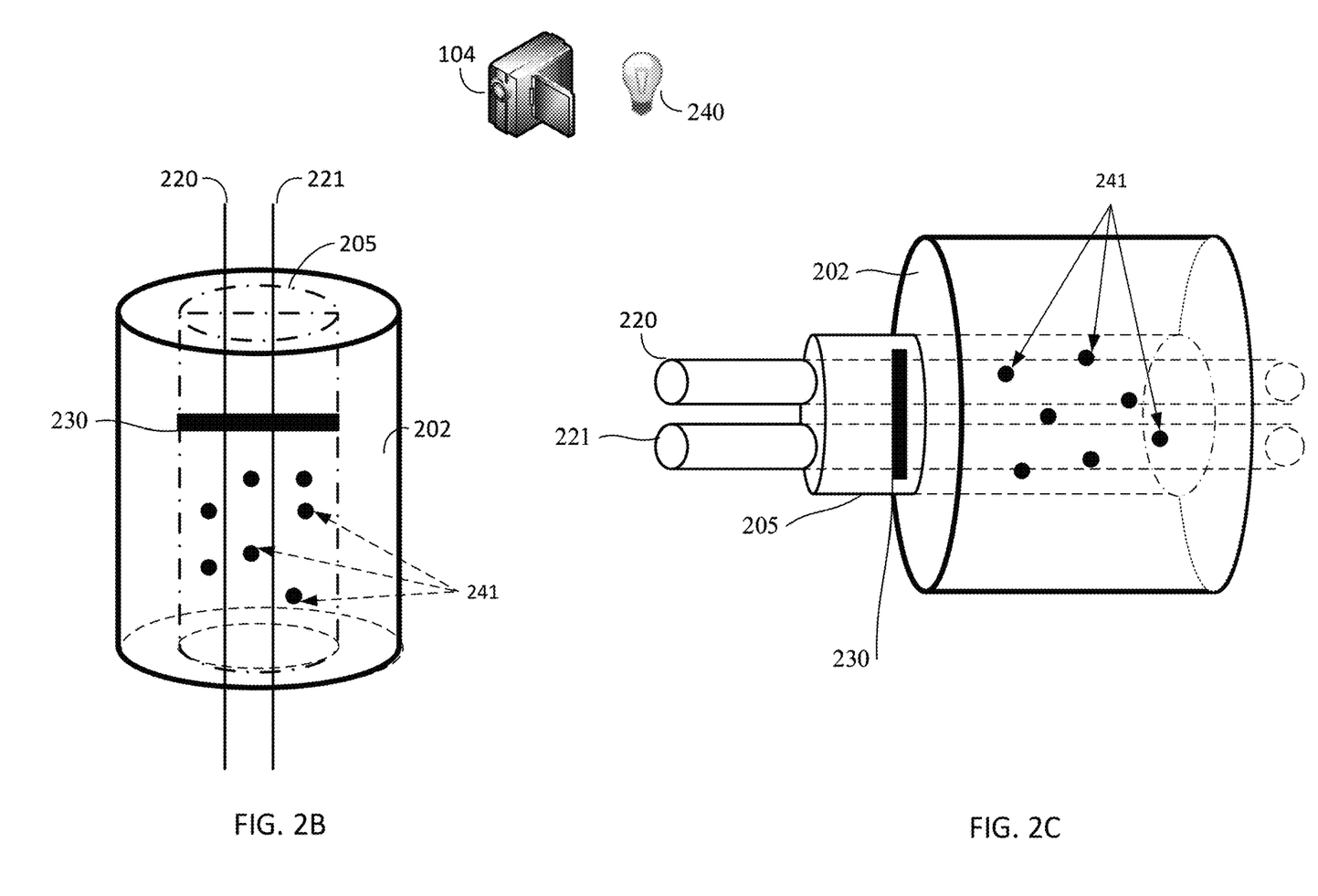
FIGS. 2B and 2C are diagrams illustrating the cross section of robotic thread 102, in accordance with another embodiment of the present invention.

FIGS. 2B and 2C are diagrams illustrating the cross section of robotic thread 102, in accordance with another embodiment of the present invention. In this embodiment, robotic thread 102 does not contain a power supply and/or a communication component. Instead of using helical coil 203, many small/microscopic magnetic particles (i.e., magnetic particles 241) are interspersed throughout robotic thread 102. Magnetic particles 241 (e.g., ferrofluid, nanoscale ferromagnetic, ferrimagnetic particles, etc.) allows an external magnetic field to guide robotic thread 102 towards the defective/repair area. Additionally, in this embodiment, guidance system 104 is included to help guide/manipulate robotic thread 102. And external heat 240 (e.g., laser, heat gun, etc.) can be used as part of this embodiment so that robotic thread 102 does not require a power source (wired) to melt each section but can rely on external heat 240 to melt filler material 202. Therefore, computer microprocessor 230 may not be required if user would rather utilize external heat 240 and guidance system 104. A nickel-titanium alloy can be used for inner core 205 since it has a bendy and springy and responds well to external magnetic field (i.e., easier to be guided). Thus, in this embodiment, robotic thread 102 can be scaled to a smaller dimension since it does not contain a power supply and other electronic component. Thus, robotic thread 102 could be as small as a human finger or even a human hair.

Figure 3A:
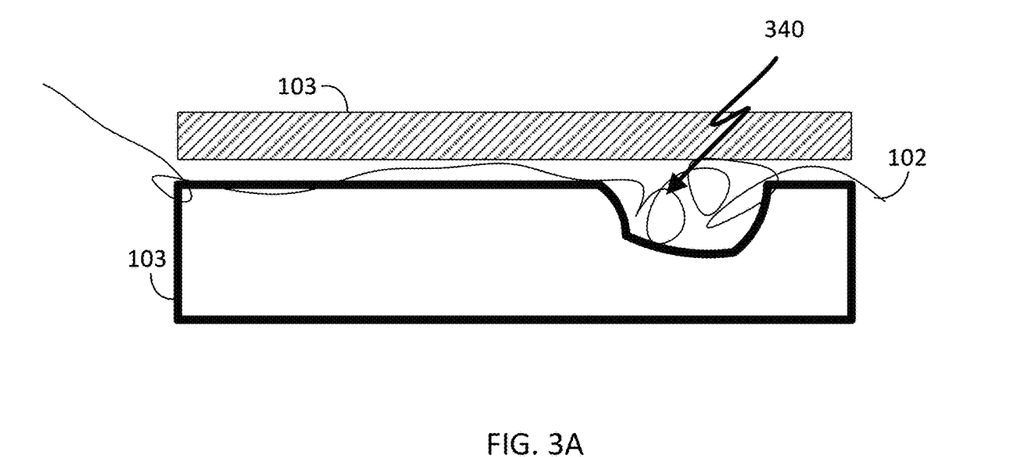
FIGS. 3A, 3B and 3C illustrate a sequence on how a robotic thread can be used to repair the defective location of a structure, in accordance with an embodiment of the present invention.
Figure 3B:
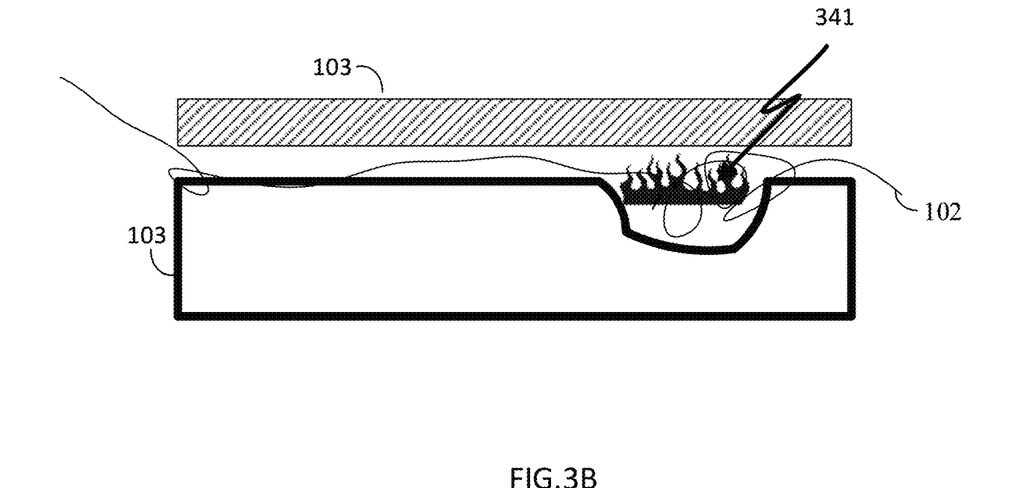
Figure 3C:
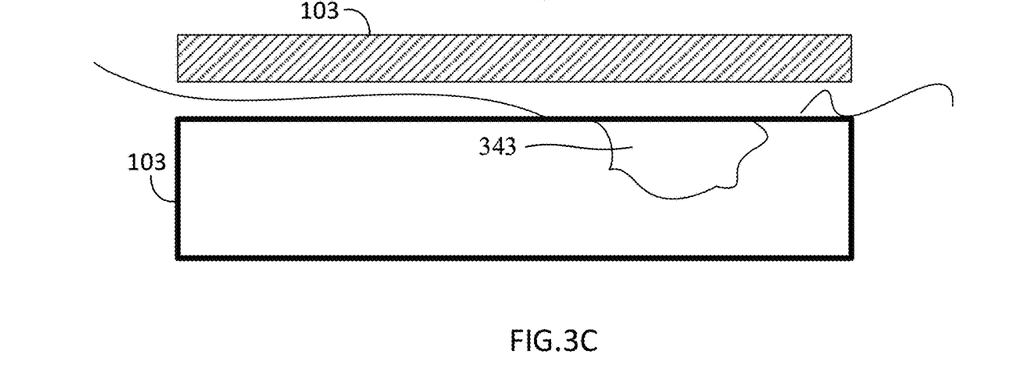

FIGS. 3A, 3B and 3C illustrate a sequence on how a robotic thread can be used to repair the defective location of a structure, in accordance with an embodiment of the present invention. FIG. 3A shows a defective area 340 of defective structure 103. Defective area 340 is located in a small and tight narrow space within defective structure 103. There is a small opening, large enough for robotic thread 102 to enter (robotic thread 102 can be made into any size, depending on the application and components used). Robotic thread 102 can be guided and/or moved/steerable (external magnetic field) by guidance system 104 or can move/steer itself (under its own power). Robotic thread, through guidance system 104 and/or repair component 111, can calculate the amount of thread (i.e., length) required of robotic thread 102 to fill in defective area 340. Any object/image detection technique, ultrasound scan and eddy current can be used to determine the volume/dimension of defective area 340.

Once, the length of robotic thread 102 is known then that same length can be guided to the defective area and can be coiled, wrapped and folded to fill the volume of defective area 340. Once positioned over defective area 340, those segments can be melted (i.e., melting 341). Recall that segments of robotic thread can either self-melt or an external heat source (i.e., 240) can be used to melt filler material 202 (see FIG. 3B). It is possible that not all robotic thread 102 can be melted at one time to fill defective area 340. Thus, it is conceivable that several layers of robotic thread 102 can be required where one layer is melted first and cool down before a subsequent layer is melted (see FIG. 3B and FIG. 3C). Once defective area 340 has been filled (i.e., filled area 343) and deemed structurally safe (i.e., inspected for structural integrity) then any remaining segments robotic thread 102 can be guided back to be reused for future repairs.

Figure 4:
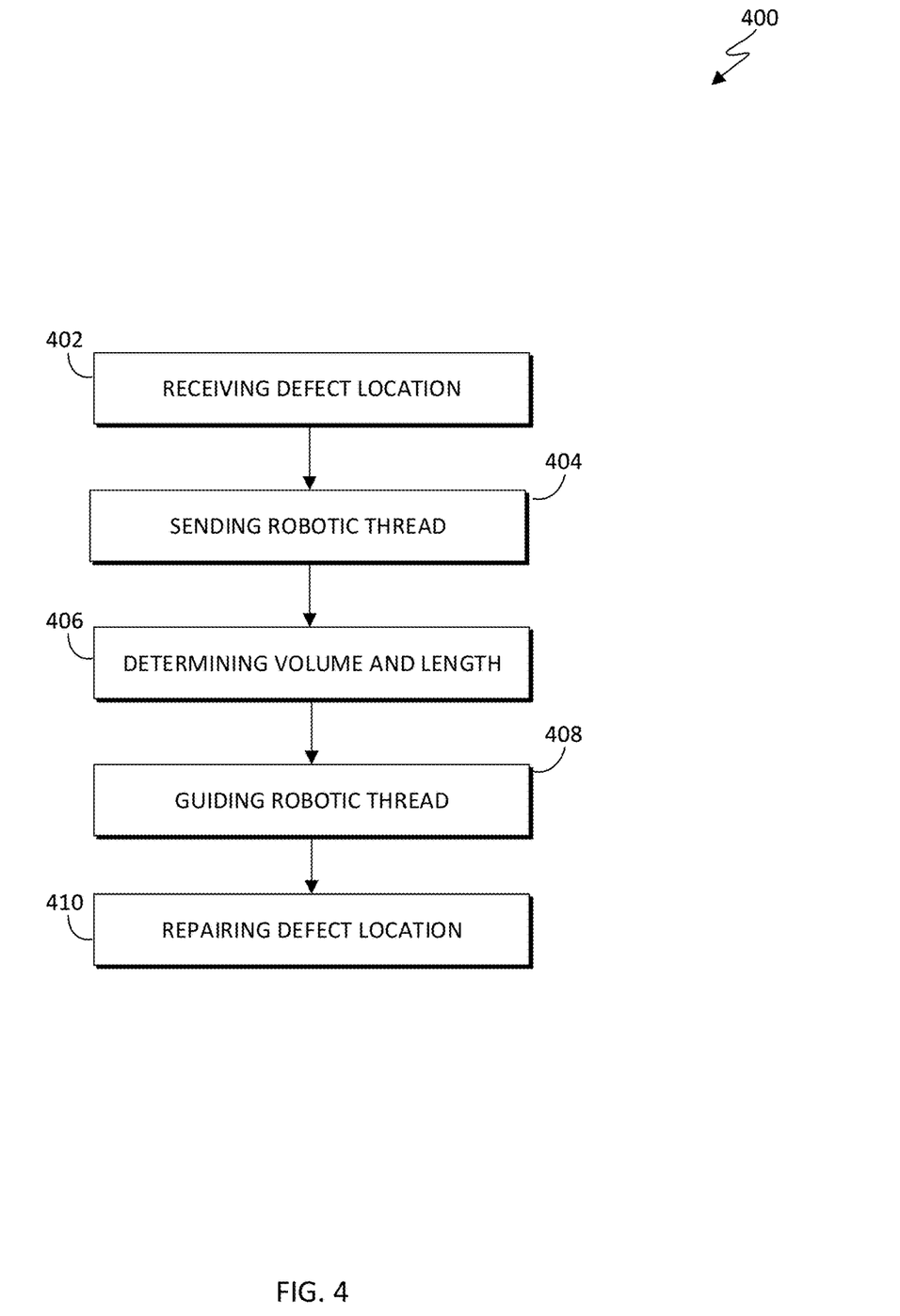
FIG. 4 is a high-level flowchart illustrating the operation of repair component 111 designated as 400, in accordance with an embodiment of the present invention.

FIG. 4 is a high-level flowchart illustrating the operation of repair component 111 designated as 400, in accordance with an embodiment of the present invention.

Repair component 111 receives a defect location (step 402). In an embodiment, repair component 111, receives instructions, including location (i.e., geographical coordinate) of defective structure that needs to be repaired. For example (see FIG. 3A), the defective structure (i.e., 103), a road tunnel, is located in a mountainous location that is difficult and long to travel by a vehicle. Within a section of a tunnel, there is an empty hole underneath a supporting structure of the tunnel that was discovered during a routine maintenance via ultrasound. However, there is small crack that developed from the empty hole that leads up to a surface of the roadway. Thus, using a robotic thread is ideal for this repair scenario. Repair component 111 receives the geographical coordinate (or GPS coordinate) of the tunnel location.

Repair component 111 sends robotic thread (step 404). In an embodiment, repair component 111, sends a drone (i.e., guidance system 104) carrying a spool of robotic thread 102 towards the road tunnel.

Repair component 111 determines a volume and length (step 406). In an embodiment, using sensors (i.e., guidance system 104) to scan defective area, repair component 111 calculates the length of robotic thread 102 required (i.e., based on dimension, volume of defective area). For example (see FIG. 3A), defective area 340, hole, is about 5 feet in diameter. Thus, 2000 feet of robotic thread 102 is required to fill in the gap.

Repair component 111 guides the robotic thread (step 408). In an embodiment, repair component 111, guides robotic thread 102 towards the defective area. Robotic thread 102 is self-movable (i.e., under its own power) and position enough of itself (i.e., 2000 feet) into a coil of the hole (i.e., defective area 340).

Repair component 111 repairs the defect location (step 410). In an embodiment, repair component 111, instructs the segment of robotic thread 102 to short circuit and melt (melting 341 of FIG. 3B). The 2000 feet segment of robotic thread melts in the hole and perfectly fills up the hole (see FIG. 3C).

Figure 5:
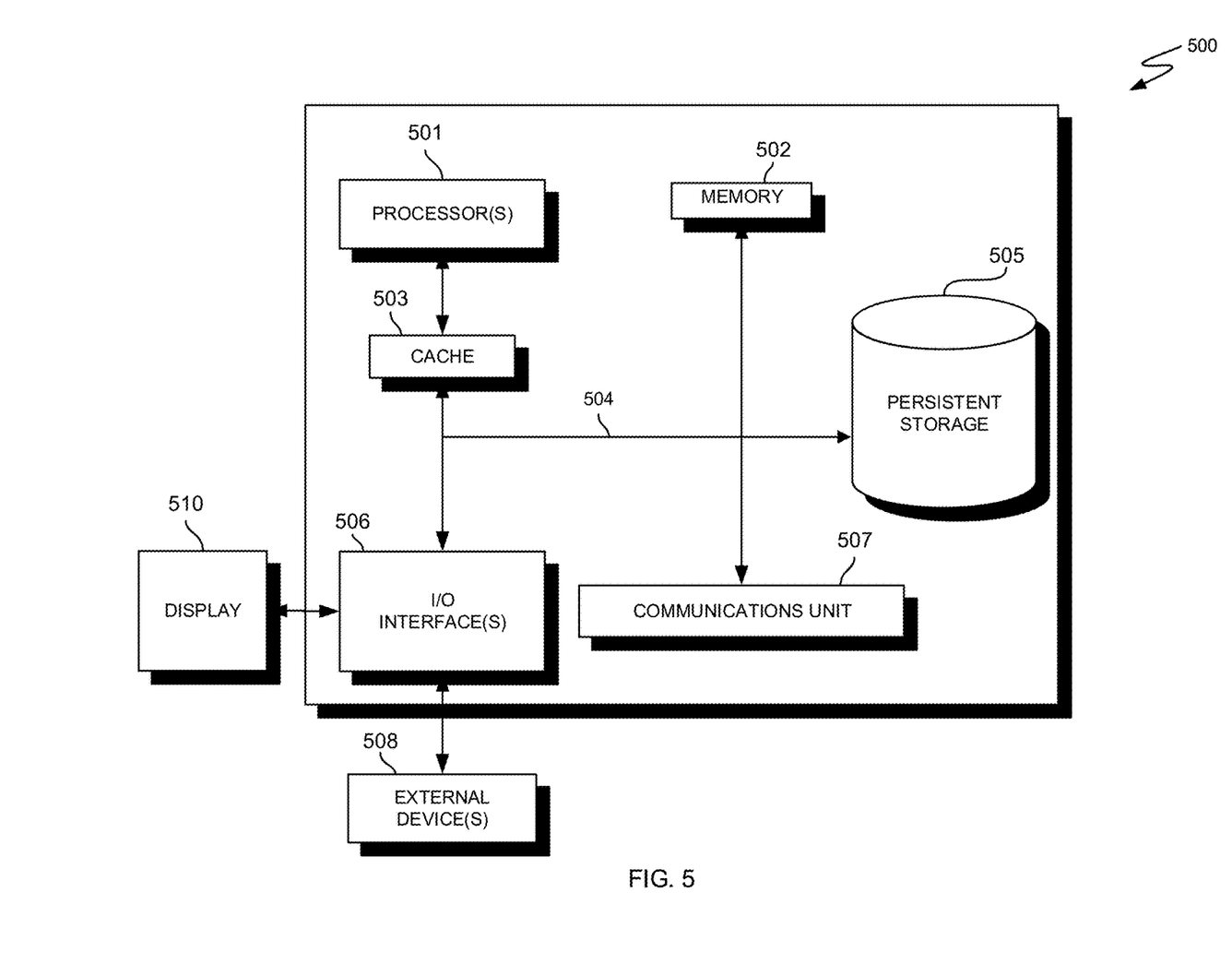
FIG. 5 depicts a block diagram, designated as 500, of components of a server computer capable of executing the repair component 111 within the robotic thread environment, of FIG. 1, in accordance with an embodiment of the present invention.

FIG. 5, designated as 500, depicts a block diagram of components of repair component 111 application, in accordance with an illustrative embodiment of the present invention. It should be appreciated that FIG. 5 provides only an illustration of one implementation and does not imply any limitations with regard to the environments in which different embodiments may be implemented. Many modifications to the depicted environment may be made.

FIG. 5 includes processor(s) 501, cache 503, memory 502, persistent storage 505, communications unit 507, input/output (I/O) interface(s) 506, and communications fabric 504. Communications fabric 504 provides communications between cache 503, memory 502, persistent storage 505, communications unit 507, and input/output (I/O) interface(s) 506. Communications fabric 504 can be implemented with any architecture designed for passing data and/or control information between processors (such as microprocessors, communications and network processors, etc.), system memory, peripheral devices, and any other hardware components within a system. For example, communications fabric 504 can be implemented with one or more buses or a crossbar switch.

Memory 502 and persistent storage 505 are computer readable storage media. In this embodiment, memory 502 includes random access memory (RAM). In general, memory 502 can include any suitable volatile or non-volatile computer readable storage media. Cache 503 is a fast memory that enhances the performance of processor(s) 501 by holding recently accessed data, and data near recently accessed data, from memory 502.

Program instructions and data (e.g., software and datax 10) used to practice embodiments of the present invention may be stored in persistent storage 505 and in memory 502 for execution by one or more of the respective processor(s) 501 via cache 503. In an embodiment, persistent storage 505 includes a magnetic hard disk drive. Alternatively, or in addition to a magnetic hard disk drive, persistent storage 505 can include a solid state hard drive, a semiconductor storage device, a read-only memory (ROM), an erasable programmable read-only memory (EPROM), a flash memory, or any other computer readable storage media that is capable of storing program instructions or digital information.

The media used by persistent storage 505 may also be removable. For example, a removable hard drive may be used for persistent storage 505. Other examples include optical and magnetic disks, thumb drives, and smart cards that are inserted into a drive for transfer onto another computer readable storage medium that is also part of persistent storage 505. Repair component 111 can be stored in persistent storage 505 for access and/or execution by one or more of the respective processor(s) 501 via cache 503.

Communications unit 507, in these examples, provides for communications with other data processing systems or devices. In these examples, communications unit 507 includes one or more network interface cards. Communications unit 507 may provide communications through the use of either or both physical and wireless communications links. Program instructions and data (e.g., Repair component 111) used to practice embodiments of the present invention may be downloaded to persistent storage 505 through communications unit 507.

I/O interface(s) 506 allows for input and output of data with other devices that may be connected to each computer system. For example, I/O interface(s) 506 may provide a connection to external device(s) 508, such as a keyboard, a keypad, a touch screen, and/or some other suitable input device. External device(s) 508 can also include portable computer readable storage media, such as, for example, thumb drives, portable optical or magnetic disks, and memory cards. Program instructions and data (e.g., Repair component 111) used to practice embodiments of the present invention can be stored on such portable computer readable storage media and can be loaded onto persistent storage 505 via I/O interface(s) 506. I/O interface(s) 506 also connect to display 510.

Display 510 provides a mechanism to display data to a user and may be, for example, a computer monitor.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

What is claimed is:

1. A robotic thread comprising:
   one or more segments, wherein each segment of the one or more segments further comprises:
      an inner core structure, wherein the inner core structure is shaped cylindrically, wherein the inner core structure comprises:
      a computer control circuit;
      an outer core structure, surrounding the inner core structure, is shape cylindrically; and
      an outer coating, surrounding the outer core structure, is shaped cylindrically.

2. The robotic thread of claim 1, wherein the inner core structure is made from one or more material influenced by magnetic fields and a plurality of conducting wires is disposed within the inner core structure.

3. The robotic thread of claim 1, wherein the inner core structure is made from nickel-titanium alloy.

4. The robotic thread of claim 2, wherein the plurality of conducting wires contains, a first wire, wherein the first wire is capability of carrying electric current and a second wire is acting as a ground.

5. The robotic thread of claim 2, wherein the one or more material influenced by the magnetic fields is a coiled helical wire capable of generating a magnetic field.

6. The robotic thread of claim 2, wherein the one or more material influenced by the magnetic fields is made of magnetic particles.

7. The robotic thread of claim 1, wherein the outer core structure comprises of a filler material, wherein the filler material is made from of tin, copper, zin, lead and aluminum.

8. The robotic thread of claim 1, wherein an outer coating is coated with a lubrication material.

9. The robotic thread of claim 1, wherein the computer control circuit contains, a computer processor, power supply and a communication component.

10. The robotic thread of claim 4, wherein the computer control circuit is electrically connected to the first and the second wire.

11. A system of repairing a structure, the system comprising:
   a guidance system;
   a heating system; and
   a robotic thread, further comprising:
      one or more segments, wherein each segment of the one or more segments further comprises:

an inner core structure, wherein the inner core structure is shaped cylindrically, wherein the inner core structure comprises:
   a computer control circuit;
an outer core structure, surrounding the inner core structure, is shape cylindrically; and
an outer coating, surrounding the outer core structure, is shaped cylindrically.

12. The system of claim 11, wherein the guidance system is a drone.

13. The system of claim 11, wherein the heating system contains a laser and heat gun.

14. The system of claim 11, wherein the outer coating is coated with a lubrication material.

* * * * *